Oct. 21, 1958  W. A. ADDIS  2,856,975
EDGE TRIMMER ATTACHMENT FOR HAND PORTABLE POWER TOOLS
Filed May 16, 1957
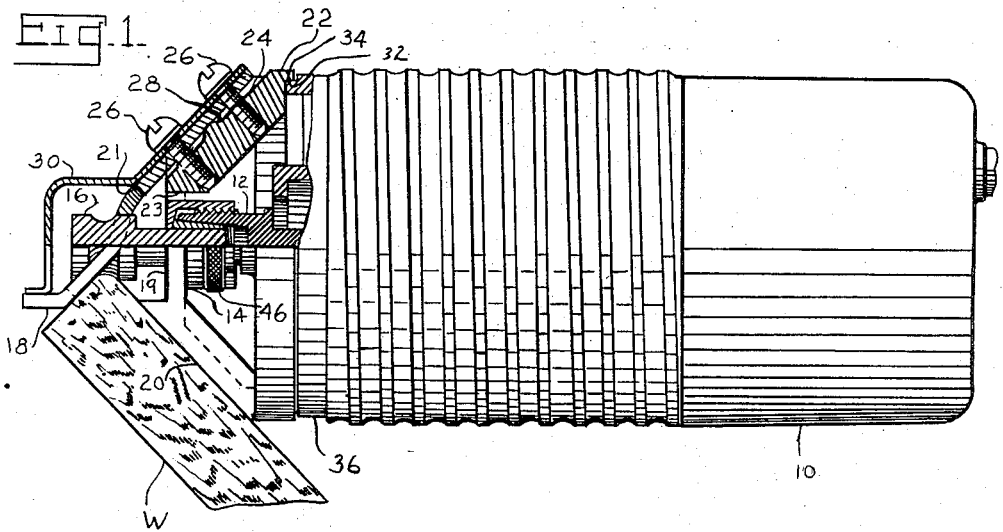
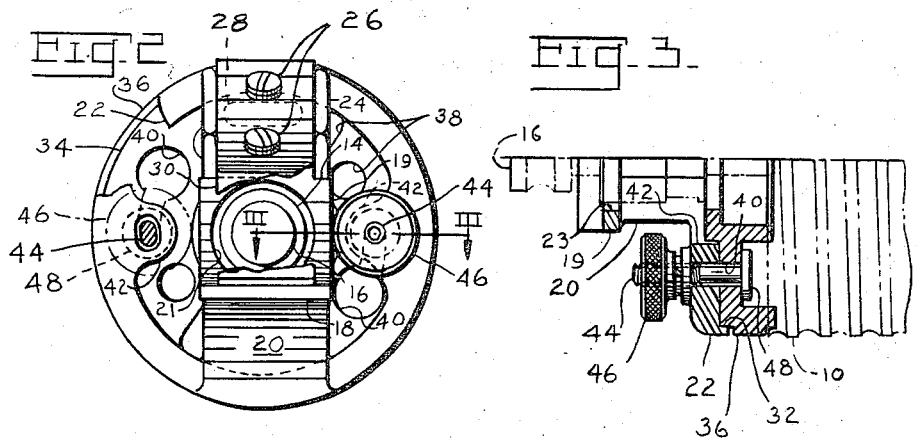
INVENTOR.
Wendell A. Addis
BY
Chapin & Neal
Attorneys

United States Patent Office 2,856,975
Patented Oct. 21, 1958

2,856,975

EDGE TRIMMER ATTACHMENT FOR HAND PORTABLE POWER TOOLS

Wendell A. Addis, Deerfield, Mass., assignor to Millers Falls Company, Greenfield, Mass., a corporation of Massachusetts Application May 16, 1957, Serial No. 659,657

7 Claims. (Cl. 144—134)

The present invention relates to improvements in hand held portable power tools and has among its objects to provide a readily removable and attachable workpiece guide for trimming the edges of flat top workpieces.

The various objects and features of the invention will be readily apparent from a reading of the following description of the disclosure found in the accompanying drawing and the particular novelty thereof pointed out in the appended claims.

In the drawing:

Fig. 1 is a side elevation, partly in section, of a power tool embodying this invention;

Fig. 2 is an end elevation with certain portions broken away, of the power tool seen in Fig. 1; and Fig. 3 is a section taken on the line III—III in Fig. 2.

The power tool seen in Fig. 1 comprises an electric motor housing 10 having a power shaft 12 extending from one end thereof. A chuck 14 is provided at the outer end of the shaft 12 for mounting a cutter 16. The illustrated cutter is intended for use in rounding the edges of workpieces. However, many other shapes of cutters could also be used.

Improved workpiece guiding means are provided for controlling the depth and angle of cut made by the cutter 16. These means include two angularly disposed surfaces one of which may be termed, for convenient reference, an edge guide 18 and the other a flat top guide 20, both of which are shown in operative engagement with a workpiece W in Fig. 1. The top guide 20 comprises the lower portion or arm of a truncated V-shaped bridge 19 which spans a circular flange 22. It will be noted that the edge guide 18 is apertured at 21 and the V-shaped bridge is apertured at 23 to provide clearance for the cutter 16 and chuck 14.

The edge guide 18 is mounted on the upper portion (designated 24) of the bridge 19 in a manner which permits it to be easily and readily adjusted with respect to the top guide 20. These adjustable mounting means include screws 26 which pass through the edge guide 18 and are threaded into the upper bridge portion 24 on either side of a lug 28 which may project therefrom. A guard 30 is interposed between the heads of screws 26 and edge guide 18 and is bent outwardly and downward over the projecting portions of cutter 16 in order to prevent inadvertent access thereto. With the described arrangement, the edge guide may be adjusted with respect to the top guide by alternately loosening and tightening the respective screws 26, thus varying the extent of access to the cutter 16 and the amount of stock removed from the edge of workpiece W.

The flange 22 could be directly fastened to the housing 10 or formed integrally therewith but it has been found preferable in accordance with another feature of the invention that it be detachably secured in the following manner. A circular recess 32 is formed on the inner surface of the flange 22 (Figs. 1 and 3), which recess is adapted to receive a shoulder 34 formed on a motor cap 36, thus positioning the guide means with respect to the cutter 16. The cap 36 is secured to the housing 10 and is provided with openings 38 (Fig. 2) for venting cooling air expelled by the motor fan (not shown). Two curved key hole slots 40 are also formed in the motor cap 36 as is best seen in Fig. 2.

The flange 22 is provided with two inwardly directed projections 42 which overlie the key hole slots 40 and are provided with non-circular openings which receive the flatted stems of screws 44 (Fig. 2). Nuts 46 are threaded onto the outer ends of screws 44 to draw screw heads 48 (Fig. 3) tightly against the inner surface of the motor cap 36. The workpiece guiding means are thus securely and accurately attached to the power unit in a desired relation to the cutter 16. This arrangement permits ready removal of the guiding means by the simple expedient of loosening the nuts 46, and rotating the flange 22 to bring the screw heads 48 to a position wherein they can pass through the enlarged ends of the key hole slots 40. Reversely, the guide means may be readily attached by passing the screw heads 48 through the enlarged ends of key hole slots 40, seating the cap shoulder 34 within the flange recess 32, rotating the flange 22 and tightening the nuts 46.

It will, of course, be appreciated that the attaching means above described could be employed with equal advantage in association with other forms of workpiece guides or in fact with other power unit attachments.

Having thus described my invention, what I claim as novel and desire to secure by Letters Patent of the United States is:

1. A portable hand held power tool comprising a motor housing having a power shaft extending from one end thereof and a cutter mounted on the end of the power shaft, a motor cap secured to said one end of the housing surrounding and generally normal to the power shaft, said cap having a circular positioning shoulder formed concentrically of said power shaft and further having a pair of key hole slots formed radially of said power shaft, a flanged member having on one side a circular recess adapted to receive said positioning shoulder, said flange having inwardly directed projections respectively overlying said key hole slots, screws slidable in said projecitons and having heads which will pass through the enlarged ends of said slots, nuts threaded upon the outer ends of said screws whereby the flange may be rotated to bring the screws within the narrow portions of the slots and the nuts rotated to clamp the screw heads against the inner surface of the motor cap, thus securely attaching the flange thereto, a truncated V-shaped bridge spanning the other side of the flange, said bridge being centrally apertured to provide clearance for the cutter which extends therebyeond, one arm of said bridge providing a flat workpiece top guiding surface angularly disposed to and leading towards said cutter, an edge guide adjustably mounted on the other arm of said bridge, said edge guide being apertured to provide clearance for said cutter and said edge guide extending therebeyond to provide a flat guiding surface angularly disposed to the plane of the top guiding surface, the line of intersection of the planes of said guiding surfaces lying within the periphery of said cutter to provide limited and controlled access of an edge of a workpiece thereto, said edge guide mounting means including a projection extending from said other bridge arm, screws passing through said edge guide and threaded into said other bridge arm on either side of said projection thereby providing means for adjusting the edge guiding surface with respect to the top guiding surface.

2. A portable hand held power tool comprising a motor housing having a power shaft extending from one end thereof and a cutter mounted on the end of the power shaft, a motor cap secured to said one end of the housing surrounding and generally normal to the power shaft, said cap having a pair of key hole slots formed radially of said power shaft, a flanged member overlying said key hole slots, screws slidable in said flange and having heads which will pass through the enlarged ends of said slots, nuts threaded upon the outer ends of said screws whereby the flange may be rotated to bring the screws within the narrow portions of the slots and the nuts rotated to clamp the screw heads against the inner surface of the motor cap, thus securely attaching the flange thereto, a top guide carried by said flange and having guiding surfaces angularly disposed to and leading towards said cutter, an edge guide having a guiding surface angularly disposed to the top guiding surface and leading towards said cutter, the extensions of said guiding surfaces being spaced apart at the periphery of the cutter to provide limited and controlled access of an edge of a workpiece thereto.

3. A portable hand held power tool comprising a motor housing having a power shaft extending from one end thereof and a cutter mounted on the end of the power shaft, a motor cap secured to said one end of the housing surrounding and generally normal to the power shaft, said cap having a circular positioning shoulder formed concentrically of said power shaft and further having a pair of key hole slots formed radially of said power shaft, and a tool attachment comprising a flanged member having on one side a circular recess adapted to receive said positioning shoulder, said flange having inwardly directed projections respectively overlying said key hole slots, screws slidable in said projections and having heads which will pass through the enlarged ends of said slots, nuts for threading upon the outer ends of said screws whereby the flange may be rotated to bring the screws within the narrow portions of the slots and the nuts rotated to clamp the screw heads against the inner surface of the motor cap, thus securely attaching the attachment thereto.

4. A portable hand held power tool comprising a motor housing having a power shaft extending from one end thereof and a cutter mounted on the end of the power shaft, a motor cap at said one end of the housing surrounding the power shaft and generally normal thereto, said cap having a plurality of key hole slots formed therein, an attachment for said power tool, a plurality of headed screws slidably in said attachment in matching relation to said key hole slots, the heads of said screws facing said cap and being adapted to enter the enlarged ends of said slots and upon shifting movement of the attachment to be engageable with the inner surface of said cap and nuts threaded onto the outer ends of each respective screw for drawing the screw heads into clamping relation with the inner cap surface.

5. A portable hand held power tool comprising a motor housing having a power shaft extending from one end thereof and a cutter mounted on the end of the power shaft, a truncated V-shaped bridge spanning said one side of the housing, said bridge being centrally apertured to provide clearance for the cutter which extends therebeyond, one arm of which provides a flat workpiece top guiding surface angularly disposed to and leading towards said cutter, an edge guide adjustably mounted on the other arm of said bridge, said edge guide being apertured to provide clearance for said cutter and said edge guide extending therebeyond to provide a flat guiding surface angularly disposed to the plane of said top guiding surface, the line of intersection of the planes of said guiding surfaces lying within the periphery of said cutter to provide limited and controlled access of an edge of a workpiece thereto, said edge guide mounting means including a projection extending from said other bridge arm, screws passing through said edge guide and threaded into said other bridge arm at opposite sides of said projection, thereby providing means for adjusting the edge guiding surface with respect to the top guiding surface.

6. A portable hand held power tool comprising a motor housing having a power shaft extending from one end thereof and a cutter mounted on the end of the power shaft, a truncated V-shaped bridge spanning said one end of the housing, said bridge being centrally apertured to provide clearance for the cutter which extends therebeyond, one arm of which provides a flat workpiece top guiding surface leading towards said cutter inwardly of its outer end and angled away from said outer end, an edge guide mounted on the other arm of said bridge, said edge guide being apertured to provide clearance for said cutter and said edge guide extending therebeyond to provide a flat guiding surface angularly disposed to the plane of the top guiding surface, the line of intersection of the planes of said guiding surfaces lying within the periphery of said cutter to provide limited and controlled access of an edge of a workpiece to the peripheral face thereof.

7. A portable hand held power tool comprising a motor housing having a power shaft extending from one end thereof and a cutter mounted on the end of the power shaft, and guide means adjacent said cutter, said means including a top guide member having a guiding surface leading towards said cutter inwardly of its outer end and angled away from said outer end and an edge guide having guiding surface angularly disposed to the first-mentioned guiding surface and leading towards the cutter, the extensions of said guiding surfaces being spaced apart at the periphery of the cutter thus providing limited access of an edge of a workpiece to the peripheral face thereof.

References Cited in the file of this patent

UNITED STATES PATENTS

| | | |
|---|---|---|
| 1,566,824 | Carter | Dec. 22, 1925 |
| 1,604,679 | Carter | Oct. 26, 1926 |
| 2,635,655 | Linstead | Apr. 21, 1953 |
| 2,771,104 | Saxe | Nov. 20, 1956 |